United States Patent [19]

Riebs

[11] 4,054,934
[45] Oct. 18, 1977

[54] SOLID STATE INVERSE OVERCURRENT RELAY

[75] Inventor: Richard E. Riebs, Hales Corners, Wis.

[73] Assignee: RTE Corporation, Waukesha, Wis.

[21] Appl. No.: 662,248

[22] Filed: Feb. 27, 1976

[51] Int. Cl.² ............................................. H02H 3/08
[52] U.S. Cl. .................................... 361/93; 361/103
[58] Field of Search .............. 317/18 R, 33 R, 33 SC, 317/38, 36 TD, 9 R, 9 A, 9 AC; 307/124, 311; 250/551; 324/96, 106; 340/189 R, 190; 361/31, 63, 93, 98, 103

[56] References Cited

U.S. PATENT DOCUMENTS

| | | | |
|---|---|---|---|
| 3,312,895 | 4/1967 | Garbuny | 340/189 X |
| 3,511,999 | 5/1970 | Pelenc | 250/551 |
| 3,546,531 | 12/1970 | Miner | 361/31 |

FOREIGN PATENT DOCUMENTS

| | | | |
|---|---|---|---|
| 2,044,443 | 3/1972 | Germany | 317/36 TD |
| 640,335 | 12/1936 | Germany | 324/96 |

Primary Examiner—Harry E. Moose, Jr.
Attorney, Agent, or Firm—Ronald E. Barry

[57] ABSTRACT

A solid state inverse overcurrent relay having a long slender wire connected to respond to a current which is proportional to the line current in a power system. An infrared detector or phototransistor is positioned to sense a predetermined color of radiation from the wire and is connected to fire a silicon controlled rectifier which is connected in series with a trip coil for a circuit breaker. The trip coil and silicon controlled rectifier are connected to an independent DC power source. The long slender wire on energization responds to the current which is proportional line current with the same time current characteristic as a fuse. In an alternate embodiment of the invention the relay is connected to the power system through a bridge rectifier which provides the DC current for operating both the heat responsive wire as well as the infrared detector.

15 Claims, 2 Drawing Figures

SOLID STATE INVERSE OVERCURRENT RELAY

BACKGROUND OF THE INVENTION

Tripping devices for power system circuit breakers have generally been of one of two forms, i.e., either an electro-mechanical induction disc relay or an electronic inverse overcurrent relay. The electronic inverse overcurrent relays have proved to be superior to the induction disc relay in terms of accuracy, flexibility, temperature stability, reduced maintenance, absence of overtravel and fast reset. Inverse overcurrent relays are most frequently coordinated with fuses. However, electronic inverse overcurrent relays have a time current characteristic in which operating time is inversely proportional to the first power of current and fuses inherently have a time current characteristic (TCC) in which operating time is inversely proportional to about the second power of current. Complex circuits are therefore required to make the actual time current characteristic of the electronic inverse overcurrent relay approximate the time current characteristic of the fuse.

SUMMARY OF THE INVENTION

The inverse overcurrent relay of the present invention inherently provides a time current characteristic in which operating time is inversely proportional to the second power of current, thus eliminating the need for elaborate curve shaping circuits as required in prior art devices. This has been accomplished by passing a current proportional to line current through a long slender wire. An infrared radiation detector is then used to sense the hottest part of the wire. Since heating of the wire is similar to heating a fuse which incurs short circuit conditions, the time current characteristic of the wire will then be inversely proportional to the second power of current. The signal produced on sensing the temperature of the wire is then used to trip the trip coil for the circuit breaker. The operating time of the wire, i.e., heating, is substantially similar to the operating time of the fuse except that the wire is never allowed to reach melting temperature.

The time current characteristic of the relay can be modified by merely varying the current network shunting the wire. This will result in various degrees of reduction of the slope of the time current characteristic such that trip time is inversely proportional to less than the second power of line current.

DRAWINGS

DESCRIPTION OF THE INVENTION

Figure 1:
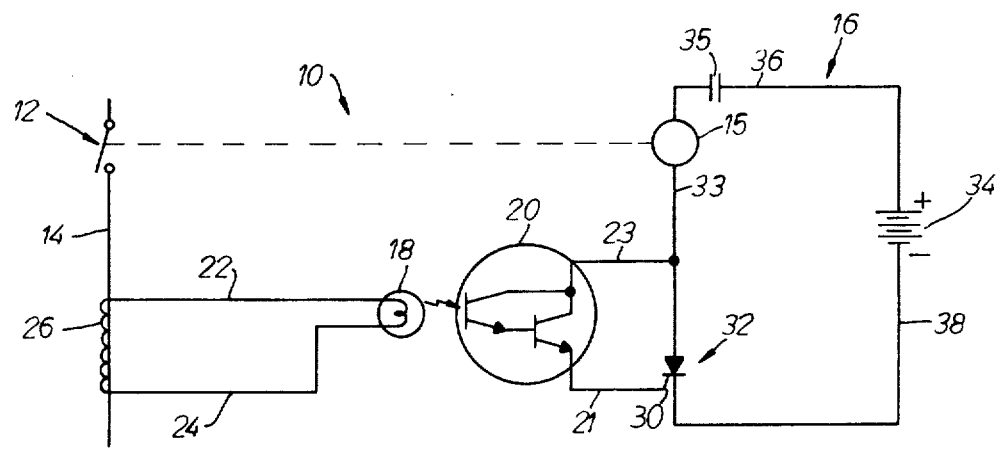
FIG. 1 is a circuit diagram of the solid state inverse overcurrent relay having an independent DC power source.

Referring to FIG. 1 of the Drawings the inverse overcurrent relay 10 is shown connected to a circuit breaker 12 which is connected to open a power system 14. The circuit breaker 12 is tripped by means of a trip coil 15 which is connected in the tripping circuit 16 of the relay 10. The relay 10 generally includes means for providing heat in proportion to line current in the form of a lamp or wire 18 and means for detecting a predetermined amount of heat or energy radiation from said wire 18 in the form of a radiation detector or phototransistor 20.

The lamp or wire 18 can be in the form of a tungsten filament or any material that will withstand high temperature and is connected by leads 22 and 24 to a current transformer 26 provided on the power system 14. Any variation in current in the power system 14 will produce a variation in the heat or energy radiation produced from the wire 18 proportional to the current in the power system 14. Under short circuit conditions the temperature rise will be quite rapid while overload conditions will produce a much more gradual rise.

The infrared detector 20 is connected by line 21 to the gate circuit 30 of a silicon controlled rectifier SCR 32 and in shunt relation thereto by a line 23 to provide current to trigger the rectifier 32 when the infrared detector 20 is energized. The silicon controlled rectifier 32 is connected by line 33 in series with the trip coil 15 and in series with a circuit breaker auxiliary contact 35 and an independent source of DC power 34 by lines 36 and 38. The infrared detector 20 can be in the form of a phototransistor which will respond not only to heat but also to the total energy radiation from the wire 18.

In the inoperative condition the tripping circuit 16 is normally open and remains open until the energy or heat radiation from the wire 18 is sufficient to activate the detector 20. On activation of the detector 20 current is provided to the gate circuit 30 to trigger the silicon controlled rectifier 32. Once the SCR 32 is turned "on" the circuit from the DC power source 34 through the trip coil 15 is completed. Energizing of the trip coil 15 will open the circuit breaker 12 and the contact 35.

Under short circuit conditions the time required for the wire 18 to reach the predetermined signal is inversely proportional to approximately the second power of current. It should be apparent that this time current characteristic is the same as a fuse, however, the predetermined signal used to open the power system occurs below the melting point of the wire 18. Under overload conditions the time required to heat the wire to produce the predetermined signal is much longer, but the predetermined signal is reached before the melting point of the wire.

Figure 2:
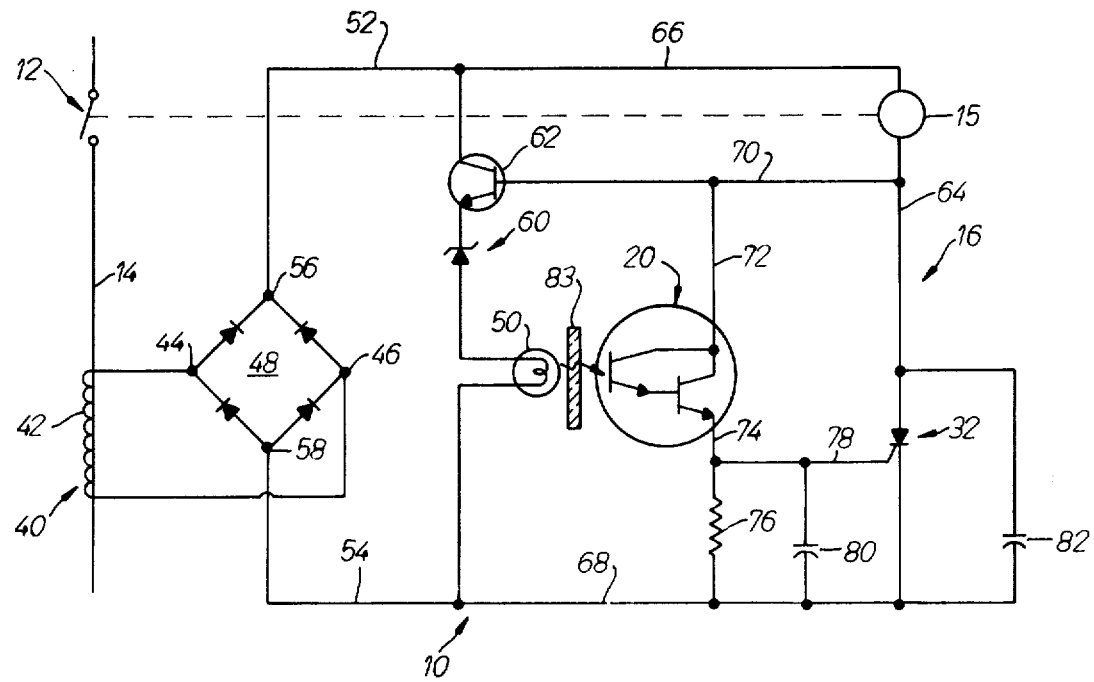
FIG. 2 is a circuit diagram of the solid state inverse overcurrent relay utilizing the DC output of a bridge rectifier which is connected to the power system for providing the DC power for the relay.

In the alternate embodiment of the invention shown in FIG. 2 a circuit breaker 12 is shown connected in the power system 14 which is tripped by means of a trip coil 15 provided in the tripping circuit 16 of the relay 10. In this embodiment the relay 10 includes a current transformer 40 which is connected to the power system 14 and includes a secondary winding 42. The secondary winding 42 is connected to the input terminals 44 and 46 of a bridge rectifier 48. The secondary winding 42 of the transformer 40 provides a current proportional to line current in the power system 14 which is rectified by means of the bridge rectifier 48 to provide DC current for the relay 10.

Heat or radiation in proportion to the line current in the power system 14 is generated by means of a lamp or wire 50 which is connected by leads 52 and 54 to the output terminals 56 and 58 of the bridge rectifier 48. A zener diode 60 and a transistor 62 are connected in series with the lamp 50. The trip coil 15 is connected by lead 64 in series with the SCR 32 and by leads 66 and 68 in parallel with the lamp 50. The base of the transistor 62 is connected by a lead 70 to the lead 64.

The transistor 62 is normally turned on since there is sufficient current in the base 70 to activate the transistor. The voltage drop across the zener diode 60 is sufficient to provide operating voltage for the rest of the relay circuit.

The temperature or amount of energy radiation from the lamp 50 is sensed by means of the phototransistor 20. In this regard the phototransistor 20 includes a collector circuit 72 connected to receive current from the base circuit 70 of the transistor 62. The emitter of the phototransistor 20 is connected by a lead 74 through a resistance 76 to the lead 68. The gate circuit 78 for the silicon controlled rectifier 32 is connected to the emitter lead 74 of the phototransistor 20 to provide triggering current for the SCR 32.

In operation, the transistor 62 is turned "on" whenever the DC current is present in the relay circuit 16. When the temperature of the lamp 50 reaches a level at which 900 nanometer radiation is produced, the silicon phototransistor 20 will turn "on" to fire the SCR 32. When the SCR 32 fires, the lamp and phototransistor 20 will be short circuited so that no further heating of the lamp 50 will occur and no base current will flow in transistor 62 (in a fuse the fuse wire breaks upon reaching a predetermined temperature to open the circuit through the fuse). All of the current transformer secondary current will then pass through the trip coil 15 to open the circuit breaker 12. Capacitors 80 and 82 are connected across the resistance 76 and SCR 32 to prevent unwanted firing of the SCR 32 by stray voltages. The time current characteristic of the relay shows trip time to be inversely proportional to the second power of current in the secondary.

While a conventional silicon phototransistor is sensitive to radiation at wavelength shorter than about 900 nanometers, a filter 83 can be placed between wire 50 and phototransistor 20 to prevent radiation from reaching detector 20 until an even shorter wavelength is produced. Use of filter 83 increases the level of temperature at which the relay will trip.

It is also possible to reduce the value of resistor 76 to the point where considerable current must flow in detector 20 before 32 will trip. The relay 10 can then be made to trip at a level of total radiation, rather than when a small amount of radiation occurs at a fixed wavelength such as 900 nanometers.

The embodiments of the invention in which an exclusive property or privilege is claimed are defined as follows:

1. A relay for tripping a circuit breaker in a power system, said relay comprising:
   means connected to respond to current flow in the power system for providing a heat radiation signal having a time-current characteristic in which the time to reach a predetermined temperature is inversely proportional to the second power of current,
   and sensing means operatively connected to the circuit breaker, said sensing means being sensitive to the predetermined heat radiation signal from said heat radiation signal means for tripping said circuit breaker in response to the predetermined signal.

2. The relay according to claim 1 wherein said sensing means is responsive to the total energy radiation from the signal means.

3. The relay according to claim 1 wherein said signal means comprises a long slender wire.

4. The relay according to claim 1 wherein said sensing means comprises a phototransistor.

5. A relay for tripping a power system circuit breaker, said relay comprising:
   means connected to the power system for providing a radiation signal proportional to line current flow in the power system with the same time-current characteristic as a fuse,
   a trip coil connected to the circuit breaker, and radiation sensing means connected to energize said trip coil in response to a predetermined radiation signal whereby the circuit breaker is opened when the predetermined signal is sensed.

6. The relay according to claim 5 wherein said sensing means includes a silicon controlled rectifier connected in series with said trip coil and a DC power source, said sensing means being connected to fire and silicon controlled rectifier upon sensing the predetermined radiation signal.

7. The relay according to claim 6 wherein said sensing means includes a phototransistor.

8. An overcurrent protective circuit for an electric current circuit comprising:
   a current transformer coupled to the circuit having a secondary for supplying current proportional to current flow in said circuit,
   a bridge rectifier connected to the secondary of the transformer and having direct current output lines,
   a trip coil and a silicon controlled rectifier connected in series with the direct current lines,
   a shunt circuit connected across said output lines and including a heater wire for providing a radiation signal having the same time-current characteristic as a fuse,
   and a phototransistor connected to the silicon controlled rectifier and positioned to respond to a predetermined signal from the heater wire to fire the silicon controlled rectifier and energize the trip coil to open the circuit.

9. The circuit according to claim 9 wherein said shunt circuit includes a transistor having a base circuit connected across said trip coil and a zener diode connected in series with said heater wire and transistor.

10. A solid state inverse overcurrent relay for tripping a power system circuit breaker, said relay comprising:
    an infrared radiation signal means connected to provide a heat radiation signal in proportion to the current flow in a power system which is time dependent upon the thermal time constant of the radiation source,
    an infrared detector positioned to respond to the infrared radiation signal means and trip means connected to said detector to respond to a predetermined radiation signal to trip and circuit breaker.

11. The relay according to claim 10 wherein said detector is responsive to the total energy radiation from the signal means.

12. An inverse overcurrent circuit for tripping a power system circuit breaker under overcurrent conditions, said circuit comprising:
    a source of infrared radiation connected to respond to current flow in the power system circuit, said source having a thermal response inversely proportional to the second power of current,
    a trip coil connected to the circuit breaker and means responsive to the infrared radiation from said source for energizing said trip coil to open said circuit breaker.

13. A solid state inverse overcurrent relay for a power system, said relay comprising:
    means connected to respond to current flow through the power system for providing an infrared radiation signal which is time dependent upon the thermal time constant of the radiation source and the magnitude of current flow, an infrared radiation detector positioned to sense the radiation signal from said providing means, and a tripping circuit including a circuit breaker in said power system and connected to respond to a predetermined infrared radiation signal sensed by said detector to open said circuit breaker.

14. The relay according to claim 13 wherein said detector comprises a phototransistor.

15. The relay according to claim 13 including an independent DC source for energizing said detector.

* * * * *